United States Patent [19]
Barnard

[11] 3,713,456
[45] Jan. 30, 1973

[54] FLUIDIC TIMER

[75] Inventor: Daniel D. Barnard, Birmingham, Mich.

[73] Assignee: The Bendix Corporation

[22] Filed: Dec. 21, 1970

[21] Appl. No.: 99,801

[52] U.S. Cl. ............................................. 137/81.5
[51] Int. Cl. ................................................ F15c 1/12
[58] Field of Search ..................................... 137/81.5

[56] References Cited

UNITED STATES PATENTS

| | | | |
|---|---|---|---|
| 3,331,380 | 7/1967 | Schonfeld et al. | 137/81.5 |
| 3,498,307 | 3/1970 | Adams | 137/81.5 |
| 3,545,468 | 12/1970 | Freeman et al. | 137/81.5 |
| 3,547,414 | 12/1970 | Nardi | 137/81.5 |
| 3,581,754 | 6/1971 | Adams | 137/81.5 |
| 3,603,336 | 9/1971 | Fichter et al. | 137/81.5 |

*Primary Examiner*—Samuel Scott
*Attorney*—John R. Benefiel and Plante, Hartz, Smith & Thompson

[57] ABSTRACT

An arrangement for producing a fluid output signal of a specified duration, for use in fluidic logic and control circuits, comprising a liquid fill tank, a fill circuit which upon initiation of the circuit function is arranged to direct a predetermined volume of liquid into the tank by a continued activation of the circuit until the liquid in the tank reaches a specified level and a tank emptying and signal output circuit which removes liquid from the tank and produces the output signals as long as the level of liquid in the tank is above a second lower level, by means of a sensing tube having its outlet located at the second level which controls a pair of jet amplifiers so as to produce the output signal whenever the sensing tube is aspirating liquid from the tank and discontinue the output signal when the tube begins to aspirate air. The rate of aspiration of the sensing tube liquid and the volume of fluid supplied by the fill circuit controls the duration of the output signal.

11 Claims, 2 Drawing Figures

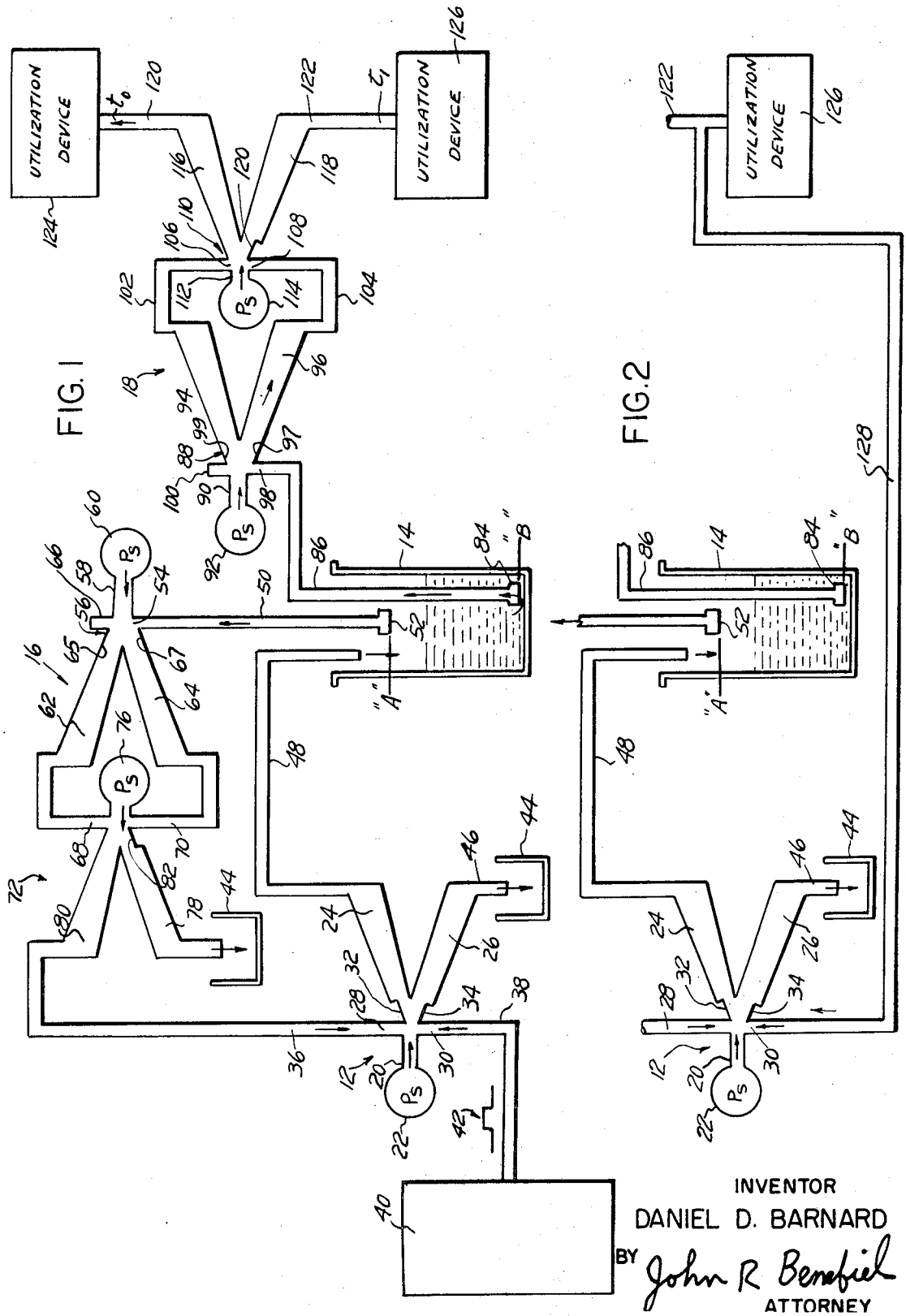

FLUIDIC TIMER

BACKGROUND OF THE INVENTION

1. Field of the Invention

This invention concerns fluidics and more specifically fluidic timers for use in fluidic logic and control circuits.

2. Description of the Prior Art

Fluidic circuits in many applications require time delays or holds of relatively long duration — ranging from several seconds to several minutes. Prior art devices rely for the most part on circuits which count periodic events such as the output of an oscillator, but for these longer time intervals the counting circuits become unduly complex and expensive unless very long period oscillators are used. Such low frequency oscillations are difficult to achieve and often are inaccurate and unreliable.

Therefore, it is an object of the present invention to provide a fluidic timer capable of producing accurately timed signals of relatively long duration without the need for complex and expensive counting circuits, and which uses a fixed minimal number of fluid amplifiers regardless of the length of the time delay.

SUMMARY OF THE INVENTION

This object and others which will become apparent upon a reading of the following specification and claims is accomplished by providing a liquid fill tank, a fill circuit which upon initiation of the circuit function directs a predetermined volume of liquid into the tank by continued activation of the circuit until the liquid in the tank reaches a specified level, and a tank emptying and signal output circuit which removes liquid from the tank and produces the output timing signal as long as the level of liquid in the tank is above a second lower level, with these functions accomplished by means of a sensing tube having its outlet located at the second level, and which controls a pair of jet amplifiers so as to produce the output signal whenever the sensing tube is aspirating liquid from the tank and to discontinue the signal upon aspirating air.

BRIEF DESCRIPTION OF THE DRAWINGS

FIG. 1 is a schematic representation of one embodiment of the fluidic timer circuit of the present invention.

FIG. 2 is a schematic representation of a second embodiment of the fluidic timer circuit according to the present invention.

DESCRIPTION OF THE EMBODIMENT

In the following detailed description, certain specific terminology will be used for the sake of clarity and specific embodiments described in order to provide a full and complete understanding of the invention, but it is to be understood that the invention is not so limited and may be practiced in a variety of forms and embodiments.

Referring to the drawing and particularly FIG. 1, the fluidic timer circuit 10 is represented, comprised of four major components: a bistable jet amplifier 12, a liquid fill tank 14, a fill control circuit 16, a tank emptying and signal output circuit 18.

The bistable jet amplifier 12 per se is well known in the art and consists of a power jet channel 20 which directs fluid received from a source 22 entirely into either output leg 24 or 26, depending on the history of control signals received in control passages 28 and 30, due to the tendency of the power jet to attach to either wall 32 or 34.

One of the control signal ports 28 is connected via passage 36 to the fill control circuit 16 while the other port 30 is connected via passage 38 to a source of an initiating signal 40 such as another portion of the logic circuit, which as indicated may transmit a pressure pulse of a square wave form 42 to set the power stream into the outlet leg 24.

Outlet leg 26 directs the fluid to the sump or return 44 via passage 46 while output leg 24 directs the liquid into the liquid fill tank 14 via passage 48.

The volume of liquid directed into the liquid fill tank 14 via outlet 24 is controlled by the fill control circuit 16 which basically functions as a level sensing arrangement. A sensing tube 50 having an outlet 52 positioned at level "A" in the liquid fill tank 14 is connected to a control port 54 of a jet amplifier 56, which includes a power stream channel 58 directing a power jet from source 60 toward outlet legs 62 and 64. A second control port 66 opposite control port 54 is provided and vented so that aspiration of air will preclude any significant wall attachment effect with surface 65 tending to pull the power jet toward outlet leg 62 since the formation of the low pressure region necessary therefor is prevented.

Similarly, whenever the liquid level is less than level "A," sensing tube 50 aspirates air, which destroys any wall attachment effect of the power jet with surface 67, so that under these conditions flow will be carried roughly equally by outlet legs 62 and 64. However, whenever the liquid level reaches level "A," the sensing tube 50 is blocked from aspirating air, allowing a low pressure region and resulting wall attachment effect with surface 67 to occur, thus directing the power jet substantially entirely from outlet leg 64.

Outlet legs 62 and 64 in turn are connected to the control ports 68 and 70 of another, monostable, jet amplifier 72 which includes a power stream passage 74 directing a power jet from source 76 toward outlet legs 78 and 80. A wall attachment surface depicted schematically at 82 is positioned just upstream of outlet leg 78 so that flow from the power jet is monostable with respect to outlet leg 78 and hence tends to exit entirely through leg 78, while flow through outlet leg 80 is astable and will continue only so long as a control signal at port 70 is strong enough to overcome the wall attachment effect.

Outlet leg 80 is connected to passage 36 connected to control port 28 of the bistable jet amplifier 12 while outlet leg 78 is connected to the sump or return 44.

Positioned at level "B" in the liquid fill tank 14 is the outlet 84 of a second sensing tube 86 operatively connected to the tank emptying and signal output circuit 18.

The circuit 18 includes a first jet amplifier 88 having a power stream passage 90 directing a power jet from source 92 toward outlet legs. 94 and 96.

A control port 98 is provided connected to sensing tube 86.

A second control port 100 is provided opposite control port 98 and vented so that air is aspirated precluding any wall attachment effect with surface 99 in the same manner as in circuit 16 so that flow tends to exit entirely through outlet leg 96.

Similarly, whenever the liquid level in fill tank 14 declines below level "B," the sensing tube 86 will aspirate air, which will in turn tend to destroy the wall attachment effect of the power jet and surface 101 so that flow will exit roughly equally from outlet legs 94 and 96. However, whenever the liquid level reaches level "B" the sensing tube 86 will be blocked from aspirating air, and will begin to aspirate liquid, allowing a low pressure region to form and produce wall attachment with outlet leg 96.

Outlet legs 94 and 96 are connected via passages 102, 104 with control ports 106 and 108 of a second, monostable, jet amplifier 110, which also includes a power stream passage 112 directing a power jet from source 114 toward output legs 116 and 118.

A wall attachment surface depicted schematically at 120 is provided just upstream from outlet leg 118 and positioned so that the power jet tends to attach thereto and exit entirely from outlet leg 118.

Outlet legs 116 and 118 are connected to output passages 120, 122 in turn connected to utilization devices on circuits depicted in block form at 124 and 126.

OPERATION

Assuming the level of liquid in fill tank 14 to be just below level "B," and the condition of bistable amplifier 12 to be that with the power jet directed entirely through outlet leg 26 to the sump 44, the sensing tube 86 will be continuously aspirating air.

This causes the power jet of the jet amplifier 88 to split equally into outlet legs 94, 96. Since the flow at the control ports 106 and 108 is thus equal, their effect on the power jet of monostable jet amplifier 110 is nil, and hence due to attachment to wall 120, the power jet will exit entirely from outlet leg 118, thus providing an output $t_1$ at the output passage 122.

To initiate the timed interval, a control pulse 42 is directed to control port 30 via passage 38, which causes the power jet of bistable jet amplifier 12 to shift to its other stable condition with flow exiting entirely from passage 24, so that liquid is directed into the fill tank 14 via passage 48. As soon as the liquid level reaches "B," sensing tube 86 begins to aspirate liquid, allowing the amplifier 88 to function so as to direct flow entirely from outlet 96, in turn causing a control signal to be applied at control port 108 of monostable jet amplifier 110. This causes a switching of the power jet to outlet leg 116, with resultant initiation of the signal $t_0$ in passage 120 defining the beginning of the timed interval.

The output of the bistable jet amplifier 12 is selected to be greater than the aspiration rate of sensing tube 86 so that there is a net flow into the fill tank 14.

As soon as the level in the fill tank 14 reaches level "A," sensing tube 50 begins to aspirate the liquid into port 54, causing the jet amplifier 56 to function so as to allow wall attachment of the power jet and surface 66 so that flow exits entirely from outlet leg 64, applying a control signal solely at port 70, which causes switching of the power jet of monostable amplifier 72 from outlet leg 78 to outlet leg 80. The resulting control signal in passage 36 introduced a port 28 of the bistable jet amplifier 12 then switches the power jet of bistable jet amplifier 12 to its original bistable condition with flow exiting entirely from outlet leg 26 to the sump 44 discontinuing further flow into the fill tank 14.

Sensing tube 86 continues to aspirate liquid so signal $t_0$ remains uninterrupted until the liquid level is again reduced to level "B," at which point aspiration of air into sensing tube 86 causes switching of monostable jet amplifier 110 back to its original state, hence discontinuing signal $t_0$ and restarting signal $t_1$.

It can be appreciated that the time interval during which the signal $t_0$ is present is controlled by the volume of liquid introduced by the bistable jet amplifier 12 as controlled by the fill control circuit 16 as well as the aspiration rate through sensing tube 86, and hence the period may be controlled over wide limits without the necessity of additional complex counting or other circuits.

As depicted in FIG. 2, the fluid timer circuit may be rendered periodic by providing a feedback passage 128 connecting passages 122 and 38 instead of an input from the rest of the logic circuitry 40.

Signal $t_1$ will then function as the initiating signal 42, causing a cyclical switching from $t_0$ to $t_1$ and back of a predetermining frequency.

Many variations of this system are, of course, possible within the scope of the present invention.

For example, this circuit while particularly suited to liquid powered systems could be adapted to pneumatic logic packages as a separate loop having its own power supply and interface to the pneumatic logic with simple infinite impedance devices.

In addition numerous alternate methods of creating the monostable characteristics of the various amplifiers are possible, such as providing bias ports, varying the geometry of the control ports, etc., as is well known in the art. Similarly, other level sensing and control circuits could be provided.

From the above description, it can be appreciated that a fluidic timing arrangement has been provided which is capable of providing accurately timed intervals of relatively long duration without the need for expensive and complex circuitry.

What is claimed is:

1. A fluidic timer comprising:
    tank means for receiving a volume of liquid;
    fill means for introducing a volume of liquid into said tank means including means for sensing the level of liquid in said tank means;
    emptying means for removing said volume of liquid from said tank means at a predetermined rate;
    signal means producing a signal corresponding to the time elapsed during removal of said volume of liquid from said tank means, whereby a signal corresponding to an interval the length of which is determined by the volume of said liquid introduced and the rate of removal is provided.

2. The timer of claim 1 wherein said emptying means includes a sensing tube extending into said tank means having an outlet at a predetermined level in said tank means and further includes a first emptying means jet amplifier having a control port and means connecting said control port with said sensing tube to cause liquid to be aspirated from said tank means through said sensor tube and wherein said first emptying means jet amplifier has a pair of outlets and tends to direct flow entirely through one of said outlets whenever said sensing tube is aspirating liquid, and wherein said signal means includes a second monostable jet amplifier and further includes means connecting opposing control ports of said jet amplifier with said pair of outlets.

3. The timer of claim 1 wherein said level sensing means includes a sensing tube having an outlet located at a level in said tank means, and also includes means for discontinuing the introduction of liquid into said tank when the liquid level in said tank reaches said sensing tube outlet.

4. The timer of claim 3 wherein said fill means includes a bistable jet amplifier and further includes means for directing one output of said bistable jet amplifier into said tank means and further includes means for switching the bistable jet amplifier from said one output when said liquid level in said tank reaches said sensing tube level.

5. The timer of claim 4 wherein said switching means includes a first jet amplifier having a control port connected to said sensing tube.

6. The timer of claim 5 wherein said switching means further includes a second, monostable jet amplifier, means connecting two outlets of said first jet amplifier to two opposing control ports of said second monostable jet amplifier, and means connecting the astable outlet of said second monostable jet amplifier to a control port of said bistable jet amplifier directed to switch said bistable jet amplifier from said one output.

7. The timer of claim 1 wherein said emptying means includes a sensing tube extending into said tank means having an outlet at a predetermined level in said tank means and further includes means for drawing liquid out of said tank means through said sensing tube.

8. The timer of claim 7 wherein said level sensing means includes a second sensing tube having an outlet located at a level in said tank means above said predetermined level, and also includes means for discontinuing the introduction of liquid into said tank when the liquid level in said tank reaches said second sensing tube outlet.

9. The timer of claim 8 wherein said fill means includes a bistable jet amplifier having a pair of outputs and further includes means for directing one output of said bistable jet amplifier into said tank means and further includes means for switching the bistable jet amplifier from said one output to the other output when said liquid level in said tank reaches said second sensing tube level.

10. The timer of claim 9 wherein said switching means includes a first jet amplifier having a control port connected to said second sensing tube.

11. The timer of claim 10 wherein said switching means further includes a monostable jet amplifier, means connecting two outlets of said first jet amplifier to two opposing control ports of said monostable jet amplifier, and means connecting the astable outlet of said monostable jet amplifier to a control port of said bistable jet amplifier directed to switch said bistable jet amplifier from said one output.

* * * * *